United States Patent [19]

Magne

[11] 3,868,342
[45] Feb. 25, 1975

[54] PROCESS FOR THE PREPARATION OF CONDENSATION PRODUCTS OF SILICON-CONTAINING AMINES WITH EPOXIDE COMPOUNDS

[75] Inventor: Robert Magne, Sainte-Foy-les-Lyon, France

[73] Assignee: Rhone-Poulenc S.A., Paris, France

[22] Filed: Nov. 24, 1971

[21] Appl. No.: 201,965

[30] Foreign Application Priority Data
Nov. 26, 1970 France .............................. 70.42483

[52] U.S. Cl. .................. 260/29.2 M, 260/29.2 EP, 260/46.5 H, 260/46.5 E, 260/824 EP, 260/825, 117/139.5 A
[51] Int. Cl. ..................... C08g 53/18, C08g 31/10
[58] Field of Search ... 260/29.2 M, 824 EP, 46.5 H, 260/825, 29.2 EP

[56] References Cited
UNITED STATES PATENTS

| | | | |
|---|---|---|---|
| 3,220,878 | 11/1965 | Pines .............................. | 260/824 EP |
| 3,305,504 | 2/1967 | Huntington ..................... | 260/29.2 M |
| 3,325,439 | 6/1967 | Steinbach ....................... | 260/46.5 H |
| 3,360,425 | 12/1967 | Boone .............................. | 260/825 |
| 3,436,251 | 4/1969 | Rees ................................. | 260/825 |
| 3,779,967 | 12/1973 | Camp ............................... | 260/29.2 M |

*Primary Examiner*—Wilbert J. Briggs, Sr.
*Attorney, Agent, or Firm*—Stevens, Davis, Miller & Mosher

[57] ABSTRACT

Condensates having free amino groups are obtained by reaction of at least 0.5 parts by weight of an amine of formula

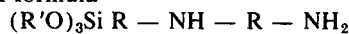

where $R'$ = alkyl and $R$ = alkylene per part by weight of an epoxide

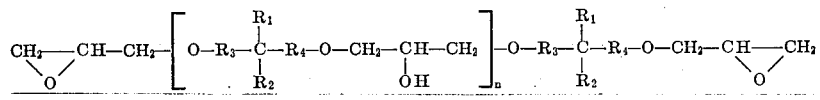

where $R_1$ and $R_2$ are H or alkyl, $R_3$ and $R_4$ are p-phenylene or substituted p-phenylene and $n$ is 1 or more. Aqueous emulsions of alkylhydrogenopolysiloxanes containing the condensates as emulsifier and polymerisation catalyst can be used to waterproof fabrics.

8 Claims, No Drawings

PROCESS FOR THE PREPARATION OF CONDENSATION PRODUCTS OF SILICON-CONTAINING AMINES WITH EPOXIDE COMPOUNDS

The present invention relates to condensates possessing free amine groups, obtained by reaction of polyamines with epoxide compounds and to the use of such condensates in aqueous emulsions of alkylhydrogenopolysiloxanes.

In one aspect, the present invention provides a condensate having free amino groups, obtained by reaction of a silicon-containing amine of general formula $(R'O)_3Si\ R - NH - R - NH_2$ in which the symbols $R'$ which may be identical or different each represent an alkyl radical and the symbols R, which may be identical or different, each represent an alkylene radical, with an epoxide of general formula

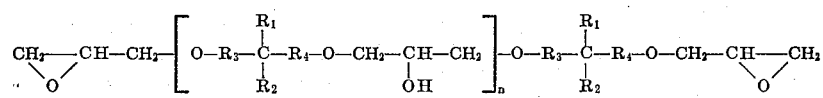

in which $R_1$ and $R_2$, which may be identical or different, each is an alkyl radical or hydrogen, $R_3$ and $R_4$ which may be identical or different each is a substituted or unsubstituted para-phenylene radical and n is an integer of at least 1, the weight ratio of the silicon-containing amine to the epoxide being at least 0.5:1.

The epoxide compounds used in the production of the condensates are those obtainable by reaction of epichlorohydrin with a dehydric phenol of formula:

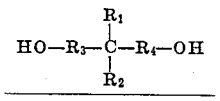

the degree of polymerisation n varying in accordance with the proportions of epichlorophydrin and diphenol involved in the reaction. Suitable epoxide compounds include diglyeidyl ethers of 2,2-bis-p-hydroxyphenyl-propane and especially those known industrially under the name of "Epikotes," such as, for example, "Epikote 815" and "Epikote 834." These epoxide compounds can be used in the process of this invention in the absence of the customary curing agents such as those described in column 2, lines 29 to 62 of U.S. Pat. No. 3,316,966.

The preparation of the silicon-containing amines $(R'O)_3Si\ R-NH-R-NH_2$ can be carried out by the method described in French Patent Specification No. 1,217,009. Preferably, the radicals $R'$ represent an alkyl radical with 1 to 12 carbon atoms such as methyl, ethyl, propyl, butyl or lauryl and are all the same in a given compound. The radicals R, which may be identical or different, each can represent an alkylene radical having 2 to 12 carbon atoms and particularly polymethylene radicals with 2 to 4 carbon atoms such as ethylene, propylene and butylene. It is not necessary that the silicon-containing amine $(R'O)_3Si\ R-NH-R-NH_2$ be absolutely pure.

The weight ratio of the silicon-containing amine to the epoxide compound should be at least 0.5:1; it is generally between 0.6:1 and 4:1 and preferably between 0.7:1 and 3:1. Ratios above 4:1 can be used but do not yield additional advantage. It is necessary for the condensation product to have free amine groups so as to ensure good solubility in an aqueous, alcoholic or aqueous-alcoholic medium. The weight ratios set out above allow the condensation reaction to be carried out with an excess of amine groups relative to the epoxide groups.

The condensation reaction can be carried out by simple mixing at a temperature of 0° to 150°C, and preferably 20° to 80°C, if desired in the presence of a solvent. In the absence of solvents, the reaction is slow and spontaneously results in a gel being obtained in a few days. The reaction can be followed by measuring the viscosity of the medium and can be stopped at the chosen moment by dilution with a hydroxylic solvent such as water or an aliphatic alcohol such as methanol. The stoppage of the condensation can also be controlled by adding a specific amount of hydroxylic solvent at the start. It is also possible to stop the reaction by acidifying the medium, for example with an aliphatic acid such as acetic acid.

The stability of the solutions of the condensate depends on the temperature and duration of reaction, on the concentration of active material and on the ratio $\rho$ which is the ratio of the number of hydrogen groups bonded to the nitrogen atoms of the silicon-containing amine, to the number of epoxide groups in the epoxide compound, for the amounts of these two reagents employed. Thus, for example, for a value of the ratio $\rho$ of 1.8:1, an alcoholic solution is stable for fifteen days at a concentration of 50% by weight of active material and for three months for a concentration of 35%. On the other hand, the aqueous-alcoholic solutions are unstable, regardless of the value of the ratio $\rho$, if the concentration of active material is greater than 25% by weight. For a concentration of 19% they gel in one week whilst for a concentration of 15% they are stable indefinitely.

The condensates of the invention can act as emulsifiers in the preparation of aqueous emulsions of alkylhydrogenopolysiloxanes and as catalysts for the polymerisation of the alkylhydrogenopolysiloxanes, and the present invention includes aqueous emulsions of alkylhydrogenopolysiloxanes containing such condensates.

It is known that aqueous emulsions of alkylhydrogenopolysiloxanes are used in the treatment of various base materials and especially fabrics, in order to render them water-repellent. The water-repellent properties of the base materials after such treatment are generally good but frequently after the water-repellent base material has been dry cleaned once or more times. Furthermore, in the case of fabrics which have been rendered water-repellent, the results obtained in the so-called "Bundesman" test, in which the water absorption of the fabric, and the water penetration, are determined, are frequently inadequate.

The aqueous emulsions of alkylhydrogenopolysiloxanes according to the invention, in addition to offering the advantage of being delivered to the user in a directly ready-to-use form, make it possible to produce water-repellent base materials which perform well in the "Bundesman" test.

The aqueous emulsions of alkylhydrogenopolysiloxanes of the invention will generally contain, by weight, 2 to 15 parts and preferably 4 to 6 parts of the said condensate per 100 parts of alkylhydrogenopolysiloxanes.

The condensates of the invention can be used in the preparation of aqueous emulsions of alkylhydrogenopolysiloxanes, either alone or in the presence of protective colloids such as, for example, polyvinyl alcohols.

The aqueous emulsions of the invention, and especially those of methylhydrogenopolysiloxanes, can also contain non-hydrogenated alkylpolysiloxanes such as dimethylpolysiloxanes, of viscosity 1,000 to 15,000 centistokes at 25°C, which give the textile base materials a handle which is particularly appreciated.

Water-repellent coatings obtained from the aqueous emulsions of alkylhydrogenopolysiloxanes form a still further aspect of the present invention.

The following Examples are given to illustrate the invention.

EXAMPLE 1 a. Preparation of an aqueous solution of a condensate according to the invention 77 g. of a silicon-containing polyamine, consisting essentially of 2-aminoethylaminopropyl-trimethoxysilane of formula $(CH_3O)_3Si—CH_2—CH_2—CH_2—NH—CH_2—CH_2—NH_2$, containing 37.9% by weight of methoxy groups (theory 41.9%) and having a neutralisation equivalent of 125, and 100 g. of a diglycidyl ether of 2,2-bis-p-hydroxyphenylpropane having an epoxide number of 0.514 and known industrially under the name of "Epikote 815" are stirred for 5 minutes in a 500 cm³ flask. The ratio $p$ defined above is 1.80:1.

The mixture is cooled in a waterbath so as to keep the temperature at about 20°C. while 38 g. of glacial acetic acid is added. The condensate is kept under nitrogen and its viscosity gradually increases until it reaches 150,000 centistokes in about 40 hours. An aqueous solution containing 12.75% by weight of condensate is prepared by dissolving the material in water.

b. Preparation of an aqueous emulsion of alkylhydrogenopolysiloxane A.

180 g. of a solution of a methylhydrogenopolysiloxane containing 37% by weight of SiH groups, (obtained by dissolving 80 parts by weight of the said polysiloxane in 20 parts by weight of a mixture containing of 71.4% by weight of toluene and 28.6% by weight of perchloroethylene), 100 g. of a 2% by weight aqueous solution of polyvinyl alcohol having an average ester number of 135 and a viscosity, as a 4% aqueous solution at 20°C, of 14 centiposes (sold under the name of Rhodoviol 14/135), and 100 g. of the aqueous solution of the condensate described in (a) above, are mixed with stirring.

Once the mixture has become homogeneous, it is grounded in a colloid mill and water is then added to it so as to give an emulsion A containing 29% by weight of methylhydrogenopolysiloxane.

Emulsion A is examined from the point of view of mechanical stability and stability to dilution in the two tests described below:

Mechanical stability. This is determined by subjecting the emulsion to a centrifugal field of 2,300 g. for 30 minutes. It is classified as good if neither creaming nor sedimentation is observed.

Stability to dilution. This is determined by diluting 80 g. of the emulsion in 920 g. of water. It is classified as good if no droplets of oil whatsoever appear on the surface within a period of 8 hours.

Emulsion A is also examined from the point of view of its effectiveness in rendering fabrics water-repellent, using the two tests described below.

Soaking test, so-called "Spray Test". Cotton fabric samples (grey loomstate fabric, simply dyed) are treated by soaking in Emulsion A which is diluted in such a way that after drying and fixing at 150°C. for 5 minutes, 1.5% by weight of silicone, relative to the weight of the fabric, remains on the fabric.

After being left for 48 hours at ambient temperature, the samples are examined in accordance with the Standard Specification AFNOR NFG 07056, "Method of test resistance of a fabric to surface wetting (spray test)." The results obtained are expressed in spray values in accordance with ratings 1, 2, 3, 4 and 5, rating 1 corresponding to complete wetting of the entire sprayed surface being observed and rating 5 corresponding to no wetting and no droplets being observed on the sprayed surface. The samples are thereafter successively dry-cleaned for a period of 15 minutes in trichloroethylene, whilst stirring, using a bath ratio of 1:30. After each dry-cleaning, the samples are again examined in accordance with Standard Specification AFNOR NFG 07056. The ratings obtained define the subsequent spray values.

"Bundesman" test. Samples of 67/33 polyester-cotton fabric are treated by soaking in the emulsion, diluted in such a way that after drying and fixing at 150°C. for 5 minutes, 1.5% by weight of silicone, relative to the weight of the fabric, remains on the fabric.

After conditioning, the samples are examined by means of the apparatus known industrially as a "Bundesman artificial rain porosimeter," in which the samples, stretced over slightly inclined pulleys, and undergoing rubbing on their underside, are subjected to artificial rain for a given period and then vigorously shaken. The percentage of water retained by the sample, by weight relative to the weight of the fabric, determines the absorption. The amount of water which has passed through the sample, expressed in cm³, determines the penetration.

The results obtained are listed in Table I below:

TABLE I

| | |
|---|---|
| Mechanical stability | good |
| Stability to dilution | good |
| Soaking test, "Spray Test" | |
| spray values | 5 |
| subsequent spray values after successive dry-cleanings | 5-4-3-3-3- |
| "Bundesman" test | |
| absorption (%) | 5.9 |
| penetration (cm³) | 0 |

For comparison purposes a second emulsion, Emulsion B, was prepared which did not contain the condensate of the invention, and similar tests were carried out on samples treated with Emulsion B.

Preparation of an aqueous emulsion of alkylhydrogenopolysiloxane B.

80 g. of an aqueous emulsion of methylhydrogenopolysiloxane containing, as emulsifiers, a mixture of polyoxyehtyleneated nonylphenol and octylphenol compounds (sold under the name of SI 4087), and 8 g. of a catlytic emulsion of the following composition by weight

| | |
|---|---|
| zinc octoate | 18.2% |
| toluene | 15 % |
| dibutyl-tin diacetate | 4 % |
| "Rhodoviol 14/135" | 1.875% |
| sodium laurylsulphate | 0.125% |
| water | 60.8% | are mixed whilst stirring

An Emulsion B is obtained which contains an equivalent amount of the same methylhydrogenopolysiloxane as Emulsion A.

Emulsion B is examined by the same test as described above. The results obtained are given in Table II below:

TABLE II

| | |
|---|---|
| Mechanical stability | good |
| Stability to dilution | good |
| Soaking test, "Spray Test" | |
| spray values | 5 |
| subsequent spray values after successive dry-cleaning | 4-3-3-2-2- |
| "Bundesman" test | |
| absorption (%) | 23.4 |
| penetration (cm³) | 7 |

Example 2

Preparation of an aqueous emulsion of methylhydrogenopolysiloxane C.

The preparation of the emulsion is carried out under the same conditions as described in Example 1 for Emulsion A, but replacing the aqueous solution of "Rhodoviol 14/135" by an equal weight of water.

The resulting Emulsion C is examined in the "Spray Test" soaking test and in the "Bundesman" test as described in Example 1 and the results obtained are given in Table III below:

TABLE III

| | |
|---|---|
| Soaking test, "Spray Test" | |
| spray values | 5 |
| subsequent spray values after successive dry-cleanings | 5-5-4-4-4- |
| "Bundesman" test | |
| absorption (%) | 3.9 |
| penetration (cm³) | 0 |

For comparison purposes Emulsion D, not containing the condensate of the invention, was prepared and tested.

Preparation of an aqueous emulsion of methylhyrogenopolysiloxane D.

80 parts by weight of an aqueous emulsion of methylhydrogenopolysiloxane "SI 4087" and 8 parts by weight of a catalytic emulsion of the following composition by weight:

| | |
|---|---|
| zinc octoate | 18.2% |
| toluene | 15 % |

-Continued

| | |
|---|---|
| dibutyl-tin diacetate | 4 % |
| "Rhodoviol 14/135" | 1.875% |
| sodium laurylsulphate | 0.125% |
| water | 60.8% | are mixed whilst stirring. An emulsion D is obtained which contains a total of 2% by weight of organic tin and zinc salts.

The emulsion D is examined in the "Bundesman" test as described in Example 1 when it is found that the absorption is 34.7% and the penetration is 5 cm³.

EXAMPLE 3

Preparation of an alcoholic solution of a condensate according to the invention.

145 g. of 2-aminoethylaminopropyl-trimethoxysilane (containing 40.6% by weight of methoxy groups) and 100 g. of methanol are heated to 64°C in a 500 cm³ flask, whilst stirring, and 100 g. of "Epikote 815" are added over the course of 20 minutes and the temperature is maintained for a further 10 minutes, whilst stirring is continued.

The mixture is then cooled to 30°C. on a waterbath and 160 g. of a mixture of equal parts by weight of methanol and glacial acetic acid are added over the course of 8 minutes, whilst stirring. An alcoholic solution containing 64.4% by weight of condensate is obtained.

Preparation of an aqueous emulsion of methylhydrogenopolysiloxane E.

80 parts by weight of an aqueous emulsion of methylhydrogenopolysiloxane "SI 4087" and 6 parts by weight of the alcoholic solution prepared as described above are mixed whilst stirring. An emulsion E containing 4.5% by weight of the condensate according to the invention is obtained.

Emulsion E is examined in the "Bundesman" test as described in Example 1 when it is found that the absorption is 10.9%, and the penetration is nil.

EXAMPLE 4

Preparation of an alcoholic solution of a condensate according to the invention.

115 g. of 2-aminoethylaminopropyl-trimethoxysilane (containing 41.7% by weight of methoxy groups and 11.6% by weight of nitrogen) and 80 g. of methanol and heated to 71°C. in a 500 cm³ flask, whilst stirring, and 50 g. of "Epikote 815" are added over the course of 18 minutes.

The mixture is cooled to 30°C. over the course of 10 minutes on a waterbath and a mixture of 280 g. of methanol and 60 g. of glacial acetic acid is added whilst stirring. An alcoholic solution containing 38.4% by weight of condensate is obtained.

Preparation of an aqueous emulsion of methylhydrogenopolysiloxane F.

80 parts by weight of an aqueous emulsion of methylhydrogenopolysiloxane "SI 40871" and 10 parts by weight of the alcoholic solution prepared as described above are mixed whilst stirring. An emulsion F, containing 4.3% by weight of the condensate according to the invention, is obtained.

Emulsion F is examined in the "Bundesman" test as described in Example 1 when it is found that the absorption is 9.2% and the penetration is nil.

EXAMPLE 5

Preparation of an alcoholic solution of a condensate according to the invention.

70 g. of the silicon-containing amine used in Example 3 and 50 g. of methanol are heated to 73°C. in a 500 cm³ flask, whilst stirring, and 50 g. of a diglycidyl ether of 2,2-bis-para-hydroxy-phenylpropane, having an epoxy number of 0.495 and known industrially by the name "Epikote 834" are added over the course of 8 minutes. The ratio $p$ is 2.14:1.

The mixture is cooled to 30°C. over the course of 12 minutes on a waterbath and a mixture of 215 g. of methanol and 38 g. of glacial acetic acid is added. An alcoholic solution containing 37.4% by weight of condensate is obtained.

Preparation of an aqueous emulsion of methylhydrogenopolysiloxane G.

80 parts by weight of an aqueous emulsion of methylhydrogenopolysiloxane "SI 4087" and 8 parts by weight of the alcoholic solution prepared as described above are mixed whilst stirring. An emulsion G containing 3.4% by weight of the condensate according to the invention is obtained.

Emulsion G is examined in the "Bundesman" test as described in Example 1 when it is found that the absorption is 8.2% and the penetration is nil.

EXAMPLE 6

Preparation of an aqueous-alcoholic solution of a condensate according to the invention.

87.5 g. of 2-aminoethylaminopropyl-trimethoxysilane containing 37.1% by weight of methoxy groups and having a neutralisation equivalent of 131, and 55 g. of methanol are heated to 74°C. in a one litre flask, whilst stirring, and 50 g. of "Epikote 815" are added over the course of 15 minutes. The ratio $p$ is 3.90:1.

The mixture is cooled to 40°C. over the course of 15 minutes on a waterbath and a mixture of 290 g. of methanol and 44 g. of glacial acetic acid is added over the course of 10 minutes, whilst keeping the temperature at 40°C. An alcoholic solution containing 34.5% by weight of condensate is obtained. An aqueous-alcoholic solution containing 9.5% by weight of condensate is prepared by dilution with water.

Preparation of an aqueous emulsion of methylhydrogenopolysiloxane H.

80 parts by weight of an aqueous emulsion of methylhydrogenopolysiloxane "SI 4087" and 40 parts by weight of the aqueous-alcoholic solution prepared as described above are mixed whilst stirring. An emulsion H containing 3.2% by weight of the condensate according to the invention is obtained.

Emulsion H is examined in the "Bundesman" test as described in Example 1 when it is found that the absorption is 5.3% and the penetration is nil.

EXAMPLE 7

Preparation of an aqueous-alcoholic solution of a condensate according to the invention.

62.5 g. of the silicon-containing amine used in Example 6 and 40 g. of methanol are heated to 74°C. in a one litre flask, whilst stirring, and 50 g. of "Epikote 815" are added over the course of 15 minutes. The ratio $p$ is 2.78:1.

The mixture is cooled to 40°C. over the course of 15 minutes on a waterbath and a mixture of 192 g. of methanol and 32 g. of glacial acetic acid is added over the course of 10 minutes whilst maintaining the temperature at 40°C. An alcoholic solution containing 38.4% of condensate is obtained. An aqueous-alcoholic solution containing 9.5% by weight of condensate is prepared by dilution with water.

Preparation of an aqueous emulsion of methylhydrogenopolysiloxane I.

80 parts by weight of an aqueous emulsion of methylhydrogenopolysiloxane "SI 4087" and 40 parts by weight of the aqueous-alcoholic solution prepared as described above are mixed whilst stirring. An emulsion I containing 3.2% by weight of the condensate according to the invention is obtained.

Emulsion I is examined in the "Bundesman" test as described in Example 1 when it is found that the absorption is 5.95% and the penetration is nil.

EXAMPLE 8

Preparation of an alcoholic solution of a condensate according to the invention.

45 g. of the silicon-containing amine used in Example 6 and 30 g. of methanol are heated to 74°C. in a one litre flask, whilst stirring, and 50 g. of "Epikote 815" are added over the course of 15 minutes. The ratio $p$ is 2.00:1.

The mixture is cooled to 40°C. over the course of 15 minutes on a waterbath and a mixture of 163 g. of methanol and 22 g. of glacial acetic acid is added over the course of 10 minutes whilst keeping the temperature at 40°C. An alcoholic solution containing 37.8% by weight of condensate is obtained.

Preparation of an aqueous emulsion of methylhydrogenopolysiloxane J.

80 parts by weight of an aqueous emulsion of methylhydrogenopolysiloxane "SI 4087" and 10 parts by weight of the alcoholic solution prepared as described above are mixed whilst stirring. An emulsion J containing 4.2% by weight of the condensate according to the invention is obtained.

Emulsion J is examined in the "Bundesman" test as described in Example 1 when it is found that the absorption is 5.4% and the penetration is nil.

EXAMPLE 9

Preparation of an aqueous-alcoholic solution of a condensate according to the invention.

250 g. of 2-aminoethylaminopropyl-trimethoxysilane (containing 41.7% by weight of methoxy groups and 12.8% by weight of nitrogen), and 160 g. of methanol are heated to 74°C. in a 2 litre flask whilst stirring, and 200 g. of "Epikote 815" are added over the course of 15 minutes. The ratio $p$ is 3.34:1.

The mixture is cooled to 40°C. over the course of 15 minutes on a waterbath and a mixture of 768 g. of methanol and 168 g. of glacial acetic acid is added over the course of 10 minutes whilst maintaining the temperature at 40°C. An alcoholic solution containing 40% by weight of condensate is obtained. An aqueous-alcoholic solution containing 12.75% by weight of condensate is prepared by dilution with water.

Preparation of an aqueous emulsion of methylhydrogenopolysiloxane K.

180 g. of a solution of a methylhydrogenopolysiloxane containing 37% by weight of SiH groups (obtained by dissolving 80 parts by weight of the said polysiloxane in 20 parts by weight of a mixture of 71.4% by weight of toluene and 28.6% by weight of perchloroethylene), 100 g. of a 2% strength by weight aqueous solution of "Rhodoviol 14/135" and 100 g. of the aqueous-alcholic solution prepared as described above are mixed, whilst stirring.

When the mixture has become homogeneous, it is ground in a colloid mill and 120 g. of water are then added to it so as to give an Emulsion K containing 28.8% by weight of methylhydrogenopolysiloxane.

Emulsion K is examined in the "Spray Test" soaking test and in the "Bundesman" test as described in Example 1. The results obtained are given in Table IV below:

TABLE IV

| Soaking test, "Spray Test" | |
|---|---|
| spray values | 5 |
| subsequent spray values after successive dry-cleanings | 5-5-4-4-4- |
| "Bundesman" test | |
| absorption (%) | 3.4 |
| penetration (cm³) | 0 |

EXAMPLE 10

Preparation of an aqueous-alcoholic solution of a condensate according to the invention.

This is prepared by the procedure described in Example 7.

Preparation of an aqueous emulsion of methylhydrogenopolysiloxane L.

180 g. of a solution of a methylhydrogenopolysiloxane containing 37% by weight of SiH groups, (obtained by dissolving 80 parts by weight of the said polysiloxane in 20 parts by weight of a mixture of 71.4% by weight of toluene and 28.6% by weight of perchloroethylene), 100 g. of a 2% strength by weight aqueous solution of "Rhodoviol 14/135" and 100 g. of the aqueous-alcoholic solution prepared as described above are mixed whilst stirring.

When the mixture has become homogeneous, it is ground in a colloid mill and 120 g. of water are then added to it so as to give an emulsion L containing 28.8% by weight of methylhydrogenopolysiloxane.

Emulsion L is examined in the test described in Example 1. The results obtained are given in Table V below:

TABLE V

| Mechanical stability | good |
|---|---|
| Stability to dilution | good |
| Soaking test, "Spray Test" | |
| spray values | 5 |
| subsequent spray values after successive dry-cleanings | 5-5-5-5-4- |
| "Bundesman" test | |
| absorption (%) | 5.5 |
| penetration (cm³) | 0 |

EXAMPLE 11

Preparation of an alcoholic solution of a condensate according to the invention 87.5 g. of the silicon-containing amine used in Example 6 and 55 g. of methanol are heated to 74°C. in a one litre flask whilst stirring, and 50 g. of "Epikote 815" are added over the course of 15 minutes. The ratio ρ is 3.90:1.

The mixture is cooled to 40°C. over the course of 15 minutes on a waterbath and a mixture of 290 g. of methanol and 44 g. of glacial acetic acid is added over the course of 10 minutes whilst maintaining the temperature at 40°C. An alcoholic solution containing 34.5% by weight of condensate is obtained.

Preparation of an aqueous emulsion of methylhydrogenopolysiloxane M.

180 g. of a solution of a methylhydrogenopolysiloxane containing 37% by weight of SiH groups, (obtained by dissolving 80 parts by weight of the said polysiloxane in 20 parts by weight of a mixture of 71.4% by weight of toluene and 28.6% by weight of perchloroethylene), and 14.3 g. of the alcoholic solution prepared as described above are mixed whilst stirring.

When the mixture has become homogeneous, it is ground in a colloid mill and 305 g. of water are then added to it to give an emulsion M containing 28.8% by weight of methylhydrogenopoylsiloxane.

Emulsion M is examined in the tests described in Example 1. The results obtained are given in Table VI below:

TABLE VI

| Mechanical stability | good |
|---|---|
| Stability to dilution | good |
| Soaking test, "Spray Test" | |
| spray values | 5 |
| subsequent spray values after successive dry-cleanings | 5-5-5-5-4- |
| "Bundesman" test | |
| absorption (%) | 5.5 |
| penetration (cm³) | 0 |

I claim:

1. An aqueous emulsion comprising an alkylhydrogenopolysiloxane and 2–15% by weight based on the weight of the alkylhydrogenopolysiloxane of a condensate having free amine groups, obtained by reaction of a silicon-containing amine of general formula (R′O)$_3$Si R — NH — R — NH$_2$ in which the symbols R′ which may be identical or different, each represent an alkyl radical and the symbols R, which may be identical or different, each represent an alkylene radical, with an epoxide of general formula

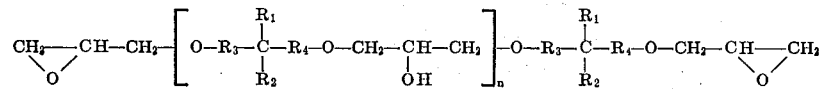

in which $R_1$ and $R_2$, which may be identical or different, each is an alkyl radical or hydrogen, $R_3$ and $R_4$ which may be identical or different each are substituted or unsubstituted para-phenylene radicals and n is an integer of at least 1, or, when $R_1$ and $R_2$ each represent methyl and $R_3$ and $R_4$ each represent p-phenylene, $n$ is 0; the weight ratio of the silicon-containing amine to the epoxide being at least 0.5:1.

2. Emulsion according to claim 1 wherein the condensate is one, in which $R_1$ and $R_2$ each represent a methyl radical and $R_3$ and $R_4$ each represent a p-phenylene radical.

3. Emulsion according to claim 1 wherein the condensate is one in which R represents a —$CH_2$—$CH_2$—$CH_2$— and /or —$CH_2$—$CH_2$— radical and R' represents a methyl radical.

4. Emulsion according to claim 1, wherein the condensate is one in which the weight ratio of amine to epoxide is 0.6:1 to 4:1.

5. Emulsion according to claim 1, wherein the condensate is one which is a reaction product of 0.7 to 3 parts by weight of 2-aminoethyl-aminopropyl-trimethoxysilane per part by weight of a 2,2-bis-p-hydroxphenyl-propane/epichlorohydrin condensate.

6. An emulsion according to claim 1 containing a dimethylpolysiloxane of viscosity 1,000–15,000 centistokes at 25°C.

7. An emulsion according to claim 1 comprising a methylhyrogenopolysiloxane and 4–6% by weight, based on the weight of siloxane, of a reaction product of 0.7 to 3 parts by weight of 2-aminoethylaminopropyl-trimethoxysilane per part by weight of a 2,2-bis-p-hydroxyphenylpropane/epichlorohydrin condensate.

8. A method of rendering a substrate water-repellent which comprises applying to the substrate an aqueous emulsion according to claim 1 and subsequently drying the substrate.

* * * * *